Figure 1:
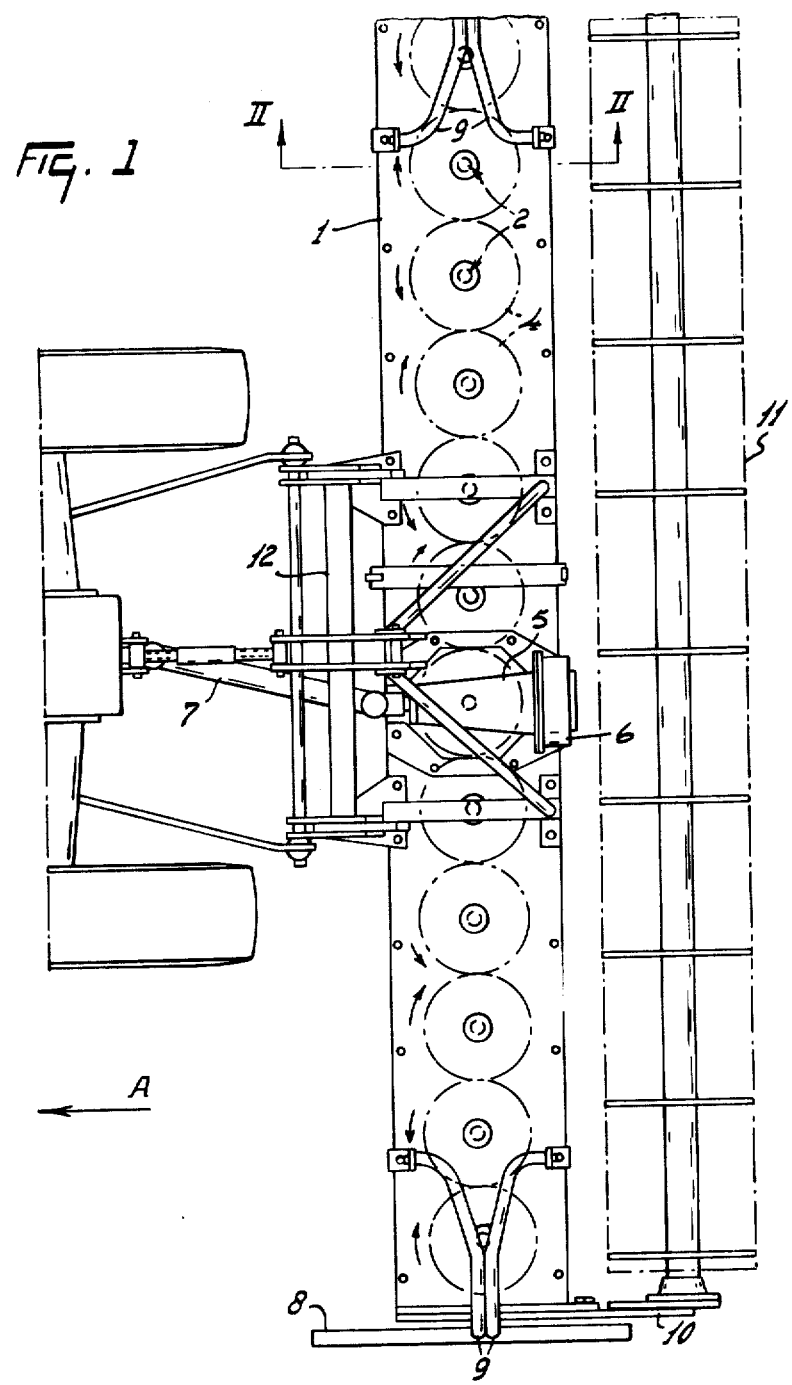

United States Patent [19]
van der Lely

[11] 4,183,231
[45] Jan. 15, 1980

[54] ROTARY HARROWS

[76] Inventor: Cornelis van der Lely, 7 Brüschenrain, Zug, Switzerland

[21] Appl. No.: 823,147

[22] Filed: Aug. 9, 1977

Related U.S. Application Data

[63] Continuation-in-part of Ser. No. 592,917, Jul. 3, 1975, abandoned.

[30] Foreign Application Priority Data

Jul. 5, 1974 [NL] Netherlands ............... 7409104

[51] Int. Cl.² ............................ F16D 3/56; F16D 9/00
[52] U.S. Cl. .................................. 64/28 R; 172/271; 172/59; 172/103; 192/56
[58] Field of Search .................... 64/28 R; 192/56; 81/52.4; 172/271, 103, 59

[56] References Cited
U.S. PATENT DOCUMENTS

| | | | |
|---|---|---|---|
| 1,740,838 | 12/1929 | Roesen | 64/28 R |
| 1,778,477 | 10/1930 | Wood | 64/28 R |
| 1,972,601 | 9/1934 | Regan | 64/28 R |
| 2,384,188 | 9/1945 | Mercier | 64/28 R |
| 3,049,898 | 8/1962 | Voth | 64/28 R |

FOREIGN PATENT DOCUMENTS

1090975 10/1960 Fed. Rep. of Germany ......... 64/28 R
24498 4/1961 German Democratic Rep. ..... 172/271

*Primary Examiner*—Charles J. Myhre
*Assistant Examiner*—R. C. Turner
*Attorney, Agent, or Firm*—Mason, Mason and Albright

[57] ABSTRACT

A safety coupling between a driving coupling and a driven coupling has a shear pin operative connection that shears upon overload, allowing relative movement between the two couplings. The shear pin is urged to establish a second operative connection after limited relative movement between the couplings. In each operative connection, respective stops retain the pin against further displacement. In one application, soil working rotors are rotated by shafts coupled to tool supports. One or more of the driving shafts can be connected to its driven support through a shear pin. A flange on the shaft has an opening that houses the lower part of the pin and the tool support has a bore that houses an upper pin part. Upon shear, the flange turns and a spring urges the remainder of the upper pin part downwardly, whereupon a recess in the flange engages that part and a second operative connection is established.

11 Claims, 6 Drawing Figures

U.S. Patent Jan. 15, 1980 Sheet 3 of 3 4,183,231

ROTARY HARROWS

This is a division of application Ser. No. 592,917 filed July 3, 1975 now abandoned.

This invention relates to soil cultivating implements or rotary harrows, such implements or harrows being of the kind which comprise a plurality of soil working members that are rotatable around corresponding upwardly extending axes, each soil working member including a tool support and at least one soil tilling tool carried thereby.

According to one aspect of the invention, there is provided a soil cultivating implement or rotary harrow of the kind set forth, wherein each tool support and a shaft embodying the corresponding axis of rotation are relatively rotatable, a shear pin being provided which establishes a driving connection between said shaft and said support.

Figure 2:
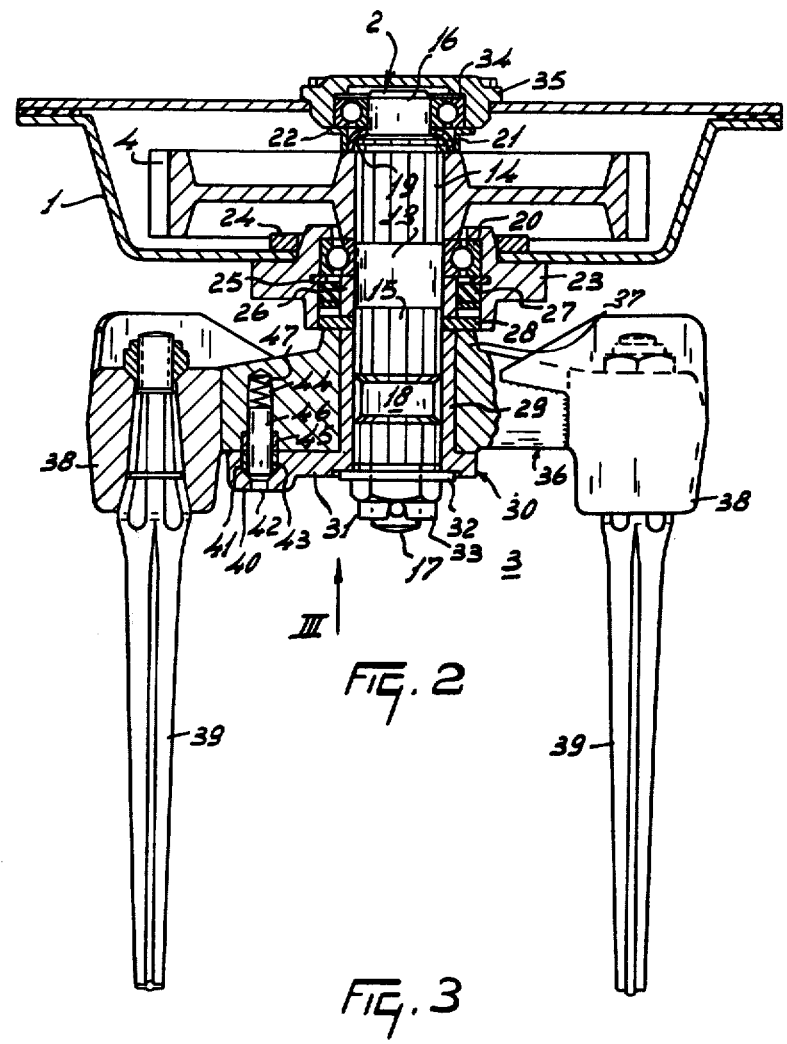
Figure 3:
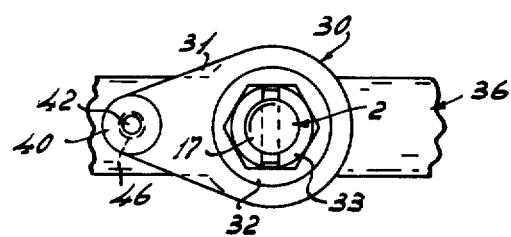
Figure 4:
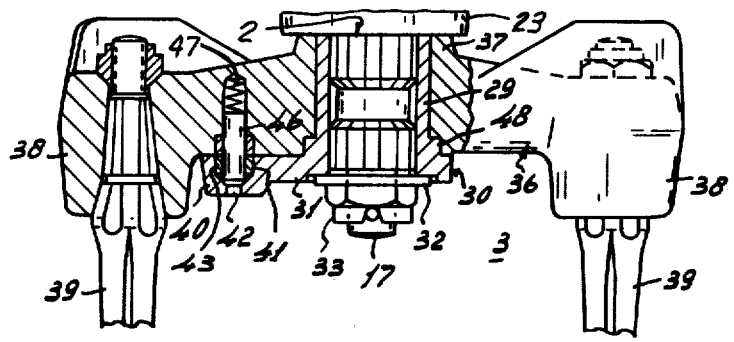
Figure 5:
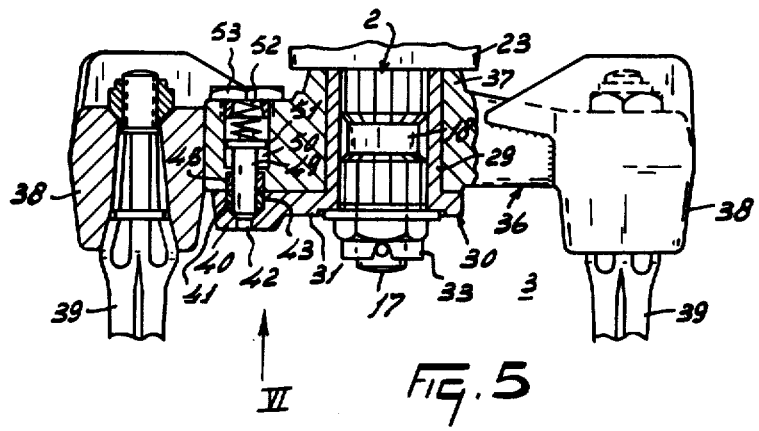
Figure 6:
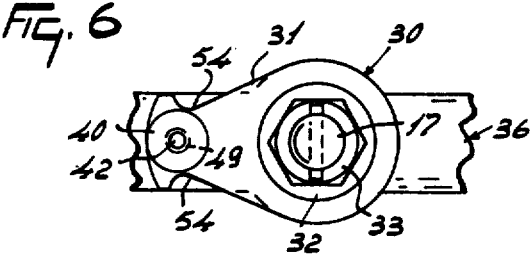

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a part-sectional elevation, to an enlarged scale, the section being taken on the line II—II in FIG. 1, FIG. 3 is an underneath plan view as seen in the direction indicated by an arrow III in FIG. 2, FIGS. 4 and 5 are views substantially corresponding to a central region of FIG. 2 but illustrating two alternative constructions, and FIG. 6 is an underneath plan view as seen in the direction indicated by an arrow VI in FIG. 5.

Referring to the accompanying drawings, the soil cultivating implement or rotary harrow that is illustrated therein will hereinafter be referred to, throughout the descriptive portion of this Specification, merely as a "rotary harrow" for the sake of brevity. The rotary harrow has a hollow box-shaped frame portion 1 that extends substantially horizontally transverse, and normally substantially horizontally perpendicular, to the intended direction of operative travel of the harrow which is indicated by an arrow A in FIG. 1. The frame portion 1 supports a plurality (twelve, in the illustrated example) of upwardly extending and normally vertical or substantially vertical shafts 2. Each shaft 2 is connected to upper and lower walls of the frame portion 1 by upper and lower ball bearings 34 and 20 that will be referred to again below and is provided, inside the hollow frame portion 1, with a corresponding straight- or spur-toothed pinion 4. The axes of rotation of immediately neighbouring shafts 2 are spaced apart by distances which should not be greater than 30 centimeters and which is preferably have magnitudes of substantially 25 centimeters. Each shaft 2 has a corresponding soil working member 3 secured to its lower end, beneath the frame portion 1, and the twelve pinions 4 that correspond to the twelve soil working members 3 are arranged inside the frame portion 1 in such a way that the teeth of each pinion 4 are in mesh with those of its neighbour, or both of its neighbours, in the single row thereof. The shaft 2 that corresponds to one of the centre pair of soil working members 3 of the single row thereof has an upward extension into a gear box 5 that is mounted on top of the frame portion 1. The shaft extension is provided, inside the gear box 5, with a bevel pinion whose teeth are in mesh with those of a further bevel pinion carried by a substantially horizontal shaft that extends substantially parallel to the direction A. A parallel substantially horizontal shaft is also rotatably mounted in the gear box 5 but at a level above that of the first mentioned substantially horizontal shaft. Splined ends of the two parallel shafts project through a rear wall of the gear box 5 into a change-speed gear 6 and any chosen co-operating pair of a number of interchangeable and/or exchangeable co-operating pairs of pinions can be slid axially onto the splined rear ends of said shafts to produce a required transmission ratio between them. The change-speed gear 6 comprises a readily releasable cover which, when fixed in position, prevents the chosen co-operating pairs of pinions and the lubricant therefor from becoming contaminated by dirt. The upper one of said two parallel substantially horizontal shafts projects forwardly in substantially the direction A from the front of the gear box 5 and is there splined or otherwise keyed to enable it to be placed in driven connection with the power take-off shaft of an agricultural tractor or other operating vehicle by way of an intermediate telescopic transmission shaft 7, which is of a construction that is known per se, having universal joints at its opposite ends.

Two substantially vertically disposed shield plates 8 are arranged immediately beyond the opposite ends of the row of soil working members 3 and are constructed so that their lower edges are slidable over the ground surface in the direction A. Each shield plate 8 is secured to the ends of a corresponding pair of arms 9 whose opposite ends are pivotally coupled to brackets on top of the frame portion 1 in such a way that each pair of arms 9, with the corresponding shield plate 8, is turnable upwardly and downwardly relative to the frame portion 1 about an axis that extends substantially horizontally parallel to the direction A. This arrangement enables the shield plates to move upwardly and downwardly, during operation of the harrow, to follow undulations in the surface of the land. The shield plates 8 minimise ridging at the edges of the broad strip of soil which is worked by the twelve members 3 and prevent stones and the like from being flung laterally of the harrow when it is at work so that bystanders will not be injured and property will not be damaged. The opposite ends of the hollow frame portion 1 are closed by substantially vertical plates that extend parallel to the direction A and arms 10 are turnable upwardly and downwardly alongside those end plates about substantially horizontally aligned strong pivots that are disposed at the tops and fronts of the end plates with respect to the direction A but which are not visible in the drawings. Rear regions of the end plates are formed with arcuately curved slots, or with curved rows of holes, the centres of curvature of said slots or rows of holes being coincident with the axis of the pivotal connections of the arms 10 to said end plates. The arms 10 are formed with single holes and bolts whose heads can be seen in FIG. 1 of the drawings are entered through those single holes and through the slots or chosen holes in the end plates of the frame portion 1 in such a way that, when said bolts are tightened, they retain the arms 10 in corresponding angular settings relative to the frame portion 1 about the axis defined by the strong pivots that have been referred to above. A rotatable supporting member in the form of an open ground roller 11 is rotatably mounted between the rearmost and lowermost ends of the two arms 10 and extends throughout substantially the whole of the working width of the harrow. It will be apparent that the angular settings of the arms 10 that are chosen about their pivotal connection to the end plate of the frame portion 1 determine the level of the axis of rotation of the roller 11 relative to the remainder of the harrow and are thus a principal factor in determining the depth of penetration of tines 39 of the soil working members 3 into the ground that is possible during the use of the harrow. The front of the frame portion 1, with respect to the direction A, is provided, midway across the width thereof, with a coupling member or trestle 12 which can be connected in a manner that is generally known per se, and that is illustrated in outline in FIG. 1 of the drawings, to the three-point lifting device or hitch at the rear of an agricultural tractor or other vehicle which moves and operates the harrow when it is in use.

FIGS. 2 and 3 of the drawings illustrate the construction and mounting of one embodiment of one of the soil working members 3 and its shaft 2 in greater detail and it will be seen from FIG. 2 that the illustrated shaft 2 has a substantially central plain portion 13 above and beneath which there are splined portions 14 and 15 respectively. The upper splined portion 14 terminates in an upper plain stub shaft 16 and the lower splined portion 15 terminates in a lower screwthreaded stub shaft 17, the stub shafts 16 and 17 being of smaller diameter than that of the remainder of the shaft 2. The lower splined portion 15 is, however, formed substantially midway along its length with a part 18 of reduced diameter. A narrow groove is formed in the upper splined portion 14 close to the integral junction of that portion with the upper plain stub shaft 16 and said groove accommodates a ring 19 which is actually afforded by two separate but identical half rings that are arranged with their internal concave curved edges in the groove. The ring 19 serves as a locking member to maintain the corresponding pinion 4 in its appointed position on the shaft 2 which it does by abutting against the upper end of the hub of the pinion, the lower end of that hub being substantially coincident with the junction between the central plain portion 13 of the shaft 2 and its upper splined portion 14. The lower end of the hub of the illustrated pinion 4 abuts against the inner race of the corresponding lower ball bearing 20 which race is arranged principally around the plain portion 13 of the shaft 2. An inverted cup ring 21 is arranged immediately above the hub of the illustrated pinion 4 and retains the two halves of the ring 19 in their appointed positions in the groove in the splined portion 14 of the shaft 2. The inner edge of the cup ring 21 surrounds the plain stub shaft 16 at the junction of that stub shaft with the splined portion 14. The inverted cup ring 21 is, in turn, surrounded by a second sleeve-shaped ring 22 which has a radial flange at its upper end, said flange being at the same level as is the inwardly directed inner and upper edge of the inverted cup ring 21.

The illustrated lower ball bearing 20 is enclosed in a bearing housing 23 which is retained in an opening in the lower wall or bottom of the frame portion 1 by bolts that are not visible in the drawings but whose screwthreaded shanks co-operate with matchingly screwthreaded bores in a fastening ring 24 located just inside the opening in the lower wall or bottom of the frame portion 1. A circlip 25 co-operates with a groove in an internal cylindrically curved surface of the housing 23 and maintains the lower bearing 20 in its appointed position axially of that housing. A spacing sleeve 26 surrounds the shaft 2 beneath the inner race of the lower bearing 20 and extends between that inner race and a locking ring 28 that surrounds the shaft 2 in closing relationship with the bottom of the bearing housing 23. As can be seen in FIG. 2 of the drawings, the locking ring 28 is arranged just inside the otherwise open bottom end of the housing 23. An oil seal 27 has its internal surface in surrounding relationship with the spacing sleeve 26 and its external surface in abutting relationship with the housing 23, said oil seal 27 being arranged immediately beneath the circlip 25. The upper end of an internally splined sleeve 29 bears against the lower surface of the locking ring 28, said sleeve 29 being arranged in surrounding relationship with the lower splined portion 15 of the shaft 2 and being formed with a flange 30 at its lower end. An outwardly tapering projection 31 is formed on the flange 30 so that, as seen in FIG. 3 of the drawings, said flange 30 with its projection 31 is substantially pear-shaped. A washer 32 is arranged around the lower screwthreaded stub shaft 17 in a shallow recess in the flange 30 and a fastening nut 33 is screwed onto the stub shaft 17 and into tight engagement with the lower surface of the washer 32. A split pin or the like is entered through a transverse bore in the stub shaft 17 to prevent the nut 33 from working loose. The assembly which comprises the sleeve 29, the ring 28, the spacing sleeve 26 and the pinion 4 is enclosed at a location between the opposite ends of the shaft 2 by the two-part locking ring 19 and the fastening nut 33.

The aforementioned upper ball bearing 34 that is illustrated in FIG. 2 of the drawings has its inner race arranged in surrounding relationship with the upper plain stub shaft 16, the outer race of said bearing 34 being disposed in an axially closed housing 35 that is located in an opening in the upper wall or top of the frame portion 1 in substantially vertical alignment with the opening that receives the lower bearing housing 23. The housing 35 is maintained in position by small bolts whose heads can be seen in FIG. 2 of the drawings and its lower surface bears against the top surface of the flange of the second sleeve-shaped ring 22 thus axially enclosing the two rings 21 and 22 between said housing 35 and its ball bearing 34 and the upper end of the hub of the corresponding pinion 4. A tine or other tool support 36 of substantially horizontal elongate configuration has a central cylindrical hub 37 which is arranged turnably around the sleeve 29 between the overlying locking ring 28 and underlying sleeve flange 30. The support 36 extends substantially perpendicularly away from its hub 37, and thus substantially perpendicularly with respect to the axis of rotation of the shaft 2, but it will be seen from FIG. 2 of the drawings that an upper region of the hub 37 is of frusto-conical configuration tapering in a direction towards the locking ring 28. The outer ends of the tine or other tool support 36 that are remote from its hub 37 have corresponding substantially cylindrical holders 38 rigidly secured to them by welding, said holders 38 firmly but releasably receiving fastening portions at the upper ends of the tines 39. Alternative tillage tools could, however, be employed in place of the tines 39. The fastening portions of the tines 39 extend substantially parallel to the shaft 2 but lower downwardly projecting active or soil working portions thereof are inclined rearwardly from top to bottom by a few degrees so that said tines 39 effectively "trail" with respect to the intended directions of operative rotation of the corresponding soil working members which are denoted by arrows in FIG. 1 of the drawings.

The flange projection 31 is formed, near its free end, with an opening 41 which extends through a downwardly thickened portion 40 of the projection. The opening 41 is of constant diameter for some distance downwardly from its upper end but it is then connected to a smaller diameter lower bore 42 by a downwardly tapered portion. The upper larger diameter portion of the opening 41 is provided with a lining in the form of a sleeve 43 that is formed from a hard steel or like material. One limb of the support 36 is formed, substantially midway between the shaft 2 and the fastening portion of the corresponding tine 39, with a cylindrical blind bore 44 that is axially parallel to the shaft 2, the lower end of said bore 44 being open and the upper blind end thereof being located internally of the material of the support 36. The bore 44 is of constant diameter throughout the greater part of its length but its upper end is of gentle upwardly tapering configuration and its lower end is enlarged to receive a lining in the form of a sleeve 45 that is made from a similar material to the sleeve 43. The opening 41 and blind bore 44 are normally in axial alignment, as illusrated in FIGS. 2 and 3 of the drawings, and a shear pin 46 which is longitudinally slidable in the bore 44 with a minimum of clearance has its lower end urged axially out of that bore by a helical compression spring 47 and into the upper larger diameter and lined portion of the opening 41. The upper end of the compression spring 47 is clamped in the upper tapering portion of the bore 44 so that gravity will not cause the spring 47 to fall out of the bore 44 when the shear pin 46 is removed.

FIG. 4 of the drawings illustrates an alternative embodiment in which each tine or other tool support 36 is formed integrally with the corresponding pair of holders 38 by forging. With this construction, a shoulder 48 is formed on the sleeve 29 immediately above the flange 30, said shoulder 48 co-operating with a matchingly shaped recess in the lower end of the hub 37 of the support 36. The mounting of the support 36 is further improved by this construction.

In the use of the rotary harrow that has been described with reference to FIGS. 1 to 3 of the drawings or with reference to FIGS. 1 to 3 as modified by FIG. 4 of the drawings, the coupling member or trestle 12 is connected to the three-point lifting device or hitch at the rear of an agricultural tractor or other vehicle and the forwardly projecting rotary input shaft of the gear box 5 is placed in driven connection with the power take-off shaft of the same tractor or other vehicle by way of the telescopic transmission shaft 7. The depth of penetration of the tines 39 into the ground is pre-set by securing the arms 10 in appropriate angular settings relative to the remainder of the harrow about their pivotal connections to the end plates of the frame portion 1. This dictates the level of the axis of rotation of the ground roller 11 relative to said frame portion 1. The speed of rotation of the soil working members 3 is determined by employing an appropriate pair of co-operating straight- or spur-toothed pinions in the change-speed gear 6. These tine depth and speed of rotation adjustments are made having regard to the initial nature and condition of the soil that is to be cultivated and the degree of fineness of the soil that is required after treatment. As the harrow moves over the ground in the direction A, its soil working members rotate in the directions which are indicated by arrows in FIG. 1 of the drawings, these directions being such that each soil working member 3 revolves in the opposite direction to its immediate neighbour, or to each of its immediate neighbours, in the single row thereof. The distance between the lowermost free ends or tips of the two tines 39 or other tools of each soil working member 3 is a little greater than is the distance between the axes of rotation of immediately neighbouring soil working members so that the twelve individual strips of land that are worked by the soil working members 3 overlap one another to form a single broad strip of worked soil. Each tine or other tool support 36 is fixed in place relative to the corresponding shaft 2 by the corresponding shear pin 46 which is maintained in its operative position in the opening 41 in the projection 31 by the corresponding spring 47. If one or both of the tines 39 of at least one soil working member 3 should strike a substantially immovable obstacle, such as a very large embedded stone or the like, the resistance to rotation of the soil working member 3 concerned rises to a very high value which tends to break or damage at least one tine 39 or alternative tool or even to bend, break or otherwise damage the whole member 3. However, such bending, breakage or other damage is avoided, or bending or other damage is reduced to a minimum, by the corresponding shear pin 46 which is pinched off across the substantially abutting ends of the sleeves 43 and 45 thus substantially instantaneously cutting off drive to the soil working member 3 concerned and allowing the corresponding shaft 2 and sleeve 29 to rotate inside the hub 37 of the support 36. The spring 47 does not drop out of the bore 44 and a new shear pin 46 can readily be pushed manually up into the bore 44, against the action of the spring 47, whereafter the new pin 46 will snap into the position illustrated in FIG. 2 or 4 of the drawings as soon as the support 36 concerned has been turned into the correct angular setting about the axis of the corresponding shaft 2. If, after pin breakage, the lower portion thereof remains in the opening 41, it can readily be removed by pushing a tool, such as a screwdriver or the like, upwardly through the lower bore 42. The shear pin 46 is completely enclosed in one limb of the support 36 and in the outwardly rounded off portion 40 of the projection 31 so that there is no significant tendency for weeds, root debris and the like to adhere and be carried along during operation.

FIGS. 5 and 6 of the drawings illustrate an alternative construction in which, however, many of the parts are similar, or identical, to parts that have already been described above and that are illustrated in FIGS. 1 to 4 of the drawings. Such parts are accordingly designated by the same references as have already been employed in FIGS. 1 to 4 of the drawings. In the embodiment of FIGS. 5 and 6 of the drawings, each soil working member 3 has a shear pin 49 part of which is arranged in a bore 50 in the corresponding support 36, said bore extending right through the material of the support 36 in a direction parallel to the axis of rotation of the corresponding shaft 2 so as to be open at both its upper and lower ends. The bore 50 is shouldered having a lower smaller diameter portion which receives the sleeve 45 and an upper, and axially longer, larger diameter portion. The shear pin 49 has a flange 51 which is a close slidable fit in the upper larger diameter portion of the bore 50. A helical compression spring 52 surrounds the upper end of the pin 49 and bears between the flange 51 and the interior of a screwthreaded plug 53 which is screwed into a short upper threaded region of the larger diameter portion of the bore 50, the upper end of said spring 52 being clamped in an upwardly tapered recess in the plug 53 so that the spring 52 is removable from the bore 50 with that plug.

Substantially semicircular recesses 54 (FIG. 6) are formed symmetrically at both sides of the projection 31 at locations which are the same distance from the axis of rotation of the shaft 2 as is the corresponding opening 41. With this construction, when the shear pin 49 is pinched off at the level of the substantial abutment between the sleeves 43 and 45, the support 36 stops rotating and the projection 31 turns onwardly about the axis of the shaft 2 and thus into a position that is out of register with the projection 31. The compression spring 52 can then expand and assist gravity in pushing the upper portion of the broken shear pin 49 downwardly until its flange 51 meets the shoulder in the bore 50. The broken shear pin 49 will then, again, project downwardly from beneath the lower end of the smaller diameter portion of the bore 50 so that, when the projection 31 has revolved through nearly 360° around the axis of the shaft 2, one of its recesses 54 will come into abutting engagement with the downwardly projecting portion of the broken pin 49 and will tend to entrain the support 36 and thus re-commence operative rotation of the soil working member 3. It will, of course, be realised that the progress of the harrow in the direction A which occurs after breakage of the shear pin 49, whilst the projection 31 is subsequently rotating freely through nearly 360°, will very often be sufficient to bring the temporarily undriven soil working member 3 clear of the large stone or other obstacle which caused the pin 49 to break. The formation of each projection 31 with two of the recesses 54 facilitates assembly and makes it unnecessary to provide two different kinds of integral sleeves 29, flanges 30 and projections 31 for use with soil working members 3 that are arranged to rotate in opposite directions. Moreover, with this construction, each shear pin 49 can be used at least twice before renewal is required, it merely being necessary to push an initially broken pin that is lodged in one of the recesses 54 upwardly into the corresponding bore 50 and to turn the support 36 until the sleeves 43 and 45 are in alignment to re-establish a positive connection between the projection 31 and the support 36 by way of the once-broken shear pin 49. The hard steel or other like sleeves 43 and 45 that line the opening 41 and the bores 44 and 50 ensure that the shear pins 46 and 49 break off substantially cleanly at the level of the very closely adjacent, if not actually abutting, ends of those sleeves thus avoiding any damage to the projections 31 and supports 36.

The constructions that have been described enable the tine or other tool supports 36 and their tines 39 or other tools to be protected in a simple but effective manner against overload together with the pinions 4 in the hollow frame portion 1 by which the soil working members 3 are driven. The shear pins 46 and 49 are arranged in the bores 44 and 50 in a spring-loaded manner and can quickly be replaced in the embodiments of FIGS. 1 to 4 of the drawings whilst being usable at least twice in the embodiment of FIGS. 5 and 6 of the drawings. The strength of the shear pins 46 and 49 is so chosen that they can together transmit a higher torque than can the common portions of the transmission which include the shafts in the gear box 5. It is preferred that a single one of the shear pins 46 or 49 should be capable of transmitting up to one-third of the total driving power that is supplied to the harrow.

Although various features of the different embodiments of the rotary harrow that have been described, and/or that are illustrated in the accompanying drawings, will be set forth in the following claims as inventive features, it is emphasised that the invention is not necessarily limited to those features and that it includes within its scope each of the parts of each embodiment of the rotary harrow that has been described, and/or that is illustrated in the accompanying drawings, both individually and in various combinations.

What we claim is:

1. A shearing coupling for transmitting force between a first coupling member and a second coupling member, comprising an elongated shear pin interconnecting said first coupling member to said second coupling member in a first operative position that holds the two coupling members against relative movement, said shear pin being shearable once the force exceeds a predetermined amount, whereby at least one of the coupling members is then set in relative movement to the other, said first coupling member comprising displacement means that automatically urges the remainder of said shear pin longitudinally relative to said first coupling member into a second operative position, the remainder of said shear pin holding said two coupling members against relative movement in said second position, retaining means holding said shear pin against further displacement relative to said first coupling member in each of the operative positions.

2. A shearing coupling for transmitting force between a first coupling member and a second coupling member, comprising an elongated shear pin interconnecting said first coupling member to said second coupling member in a first operative position that holds the two coupling members against relative movement, said shear pin being shearable once the force exceeds a predetermined amount, permitting relative rotation between the coupling members for at least about 360°, said first coupling member comprising displacement means that automatically urges the remainder of said shear pin longitudinally from said first coupling member into a second operative position, the remainder of said shear pin, holding said coupling members against relative movement in said second position, retaining means holding said shear pin against further displacement relative to said first coupling member in each of the operative positions.

3. A coupling as claimed in claim 1, wherein said first coupling member has a housing comprising a bore and at least part of said shear pin being lodged in said bore, said pin being slideably mounted in said bore, and said retaining means comprising at least one stop that holds and retains the pin within said bore in each operative position.

4. A coupling as claimed in claim 3, wherein said second coupling member has a pin receiving opening that is in alignment with said bore in the first operative position and the bottom of said opening is a first stop against which the end of the pin bears in said first position.

5. A coupling as claimed in claim 4, wherein said bottom includes converging walls that lead to a lower bore.

6. A coupling as claimed in claim 4, wherein said pin, said bore and said opening are completely enclosed within said coupling member.

7. A coupling as claimed in claim 6, wherein said bore is closed at one end by a plug, an inner part of said plug facing inwardly with respect to said bore and said part receives said displacement means.

8. A coupling as claimed in claim 6, wherein said displacement means is a spring that is positioned within said bore, one end of said spring urging the pin towards said second coupling member in each operative position.

9. A coupling as claimed in claim 8, wherein the other end of said spring bears on a flange connected to one end of said pin, said flange having a larger diameter than the remainder of said pin and larger also than a second end of the bore adjacent said second coupling member, said second end of said bore comprising a second stop.

10. A coupling as claimed in claim 1, wherein said second coupling member has at least one pin receiving recess that engages the pin in said second operative position.

11. A coupling as claimed in claim 10, wherein said second coupling member has a pin receiving recess located on each of two opposite sides from said opening.

* * * * *